(12) United States Patent
Kato et al.

(10) Patent No.: US 11,231,312 B2
(45) Date of Patent: Jan. 25, 2022

(54) LIQUID LEVEL DETECTION DEVICE

(71) Applicant: Yazaki Corporation, Tokyo (JP)

(72) Inventors: Shinpei Kato, Makinohara (JP); Shinpei Ando, Makinohara (JP); Ryo Hirose, Makinohara (JP); Shintaro Nakajima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 113 days.

(21) Appl. No.: 16/690,259

(22) Filed: Nov. 21, 2019

(65) Prior Publication Data

US 2020/0200586 A1 Jun. 25, 2020

(30) Foreign Application Priority Data

Dec. 25, 2018 (JP) .............................. JP2018-241686

(51) Int. Cl.
*G01F 23/38* (2006.01)

(52) U.S. Cl.
CPC .................................. *G01F 23/38* (2013.01)

(58) Field of Classification Search
CPC ........................................................ G01F 23/38
USPC ............................................................. 73/317
See application file for complete search history.

(56) References Cited

U.S. PATENT DOCUMENTS

| 8,671,750 | B2* | 3/2014 | Fukuhara | G01F 23/38 |
| | | | | 73/314 |
| 9,645,005 | B2* | 5/2017 | Go | G01F 23/38 |
| 9,857,213 | B2* | 1/2018 | Miyagawa | G01F 23/38 |
| 2011/0036165 | A1 | 2/2011 | Fukuhara | |
| 2015/0308880 | A1* | 10/2015 | Go | G01F 23/38 |
| | | | | 73/317 |
| 2016/0131515 | A1 | 5/2016 | Miyagawa | |
| 2018/0348037 | A1 | 12/2018 | Kato et al. | |

FOREIGN PATENT DOCUMENTS

| JP | 2007-322222 A | | 12/2007 |
| JP | 2009-257911 A | | 11/2009 |
| JP | 2014137271 A | * | 7/2014 |
| JP | 2015-004574 A | | 1/2015 |
| JP | 2016-099133 A | | 5/2016 |
| JP | 2016-223830 A | | 12/2016 |

\* cited by examiner

*Primary Examiner* — John Fitzgerald
(74) *Attorney, Agent, or Firm* — Sughrue Mion, PLLC

(57) ABSTRACT

A liquid level detection device includes a magnet holder having a magnet housed inside a holder body in which a shaft recess is formed; a sensor housing having a shaft portion protruding from the housing body and rotatably supporting the magnet holder; a float arm whose one end is fixed to a magnet holder and whose another end is attached to a float; a Hall IC provided in the sensor housing and detecting a displacement of the magnet; an annular protrusion protruding around the shaft portion from a front surface of the housing body and facing a bottom surface of the holder body; and a recess formed on the bottom surface of the holder body and into which a protruding end of the protrusion is inserted.

2 Claims, 11 Drawing Sheets

LIQUID LEVEL DETECTION DEVICE

CROSS-REFERENCE TO RELATED APPLICATIONS

This application is based on and claims priority under 35 USC 119 from Japanese Patent Application No. 2018-241686 filed on Dec. 25, 2018, the contents of which are incorporated herein by reference.

TECHNICAL FIELD

The present invention relates to a liquid level detection device.

BACKGROUND ART

A liquid level detection device (non-contact liquid level sensor) configured to detect a liquid level of a liquid stored in a tank includes a device body including a magnetoelectric conversion element (Hall element) such as an IC sensor (Hall IC), a magnet holder including a magnet rotatably provided to the device body, a float arm having a base end portion assembled to the magnet holder, and a float provided at a tip end portion of the float arm (see, for example. Patent Literature 1).

As shown in FIG. 11, a liquid level detection device of related art includes: a magnet holder 570 made of a resin material on which a fitting hole (shaft recess) 576 is formed, a central shaft (shaft portion) 531 protruding from a front surface 521a of a frame (sensor housing) 521 constituting the device body, a float arm (not shown) whose one end is fixed the magnet holder 570 and whose other end is attached to a float that moves vertically in accordance with a liquid level, and a metal rotary support 540 including a hollow cylindrical portion disposed between an inner peripheral surface of the magnet holder 570 defining the fitting hole 576 and an outer peripheral surface 531a of the central shaft 531.

The magnet holder 570 is rotatably supported on the frame 521 by the hollow cylindrical portion of the rotary support body 540 in which the central shaft 531 serving as a rotation center is disposed.

An IC sensor 525 for detecting a rotation amount of the magnet 575 accommodated inside the magnet holder 570 is installed in the central shaft 531.

CITATION LIST

Patent Literature

Patent Literature 1: JP-A-2009-257911

SUMMARY OF INVENTION

In the above-described liquid level detection device of the related art, as shown in FIG. 11, a sliding portion in a thrust direction between the magnet holder 570 and the frame 521 (a position indicated by C in FIG. 11 between a bottom surface 570a of the magnet holder 570 and the front surface 521a of the frame 521) has a flat flow path structure. Therefore, a liquid in the tank linearly flows into a gap in the thrust direction in the sliding portion. For this reason, a foreign matter D in the liquid is likely to enter these sliding portions. In particular, when the foreign substance D enters the sliding portion in a radial direction between the magnet holder 570 and the frame 521 (between the outer peripheral surface 531a of the central shaft 531 and an inner peripheral surface 540a of the rotary support 540), a dead-ended structure is formed, and thus the foreign substance D once entered is unlikely to be discharged. Therefore, there is a possibility that locking occurs in the sliding portion in the radial direction due to the foreign substance D, which causes rotation failure of the holder.

In addition, in a case where the foreign matter D entering these sliding portions is a magnetic material such as metal powder, the foreign matter D may affect a magnetic force of the magnet 575 applied to the IC sensor 525 installed on the central shaft 531, thereby deteriorating detection accuracy.

The present invention has been made in view of the above circumstances, and an object thereof is to provide a liquid level detection device capable of preventing a foreign matter in a liquid from entering a sliding portion in a radial direction between a sensor housing and a magnet holder.

The above object according to the present invention is achieved by the following configurations.

(1) A liquid level detection device including:

a magnet holder including a holder body in which a shaft recess is formed and a magnet housed inside the holder body along an inner peripheral surface of the holder body defining the shaft recess;

a sensor housing including a housing body and a shaft portion that protrudes from the housing body and that is inserted into the shaft recess to rotatably support the magnet holder;

a float arm whose one end is fixed to the magnet holder and whose another end is attached to a float configured to move vertically according to a liquid level;

a Hall IC provided in the sensor housing and configured to detect a displacement of the magnet;

an annular protrusion protruding around the shaft portion from a front surface of the housing body and facing a bottom surface of the holder body; and a recess formed on the bottom surface of the holder body and into which a protruding end of the protrusion is inserted.

According to the liquid level detection device having the configuration of (1), a liquid flowing from an outside of the sensor housing into the sliding portion in the thrust direction between the magnet holder and the sensor housing (between the bottom surface of the holder body and the housing body) collides with the annular protrusion protruding on the housing body facing the bottom surface of the holder body, and flows into the recess of the holder body. As a result, the foreign matter in the liquid is prevented from entering the sliding portion in the radial direction between the magnet holder and the sensor housing (between an inner peripheral surface of the shaft recess and an outer peripheral surface of the shaft portion).

Therefore, it is possible to prevent such a problem that locking occurs in the sliding portion in the radial direction due to the foreign substance, which causes rotation failure of the magnet holder, and thereby causes deterioration of detection accuracy of a liquid surface.

(2) The liquid level detection device according to (1), in which the protrusion has a protruding height capable of holding an overlapping state between a recess inner peripheral surface of the holder body defining the recess and a protrusion outer peripheral surface of the protrusion even when the holder body is displaced with respect to the housing body along an axial direction of the shaft portion.

According to the liquid level detection device having the configuration of (2), even when the holder body is greatly inclined and is displaced with respect to the housing body along the axial direction of the shaft portion, the protrusion outer peripheral surface of the protrusion of the housing body can hold the overlapping state with the recess inner peripheral surface of the recess of the holder body (a state having, around an entire periphery, an overlapping region in which the recess inner peripheral surface and the protrusion outer peripheral surface overlap each other along the axial direction of the shaft portion). Therefore, even when the holder body is displaced with respect to the housing body along the axial direction of the shaft portion, the liquid does not linearly flow into a gap in the sliding portion in the thrust direction from a direction orthogonal to the axial direction of the shaft portion.

(3) The liquid level detection device according to (1) or (2), in which the recess further includes an accommodating portion extending on an outer peripheral side of the magnet in the holder body.

According to the liquid level detection device having the configuration of (3), the liquid flowing from an outside of the sensor housing into the sliding portion in the thrust direction collides with the annular protrusion protruding on the housing body facing the bottom surface of the holder body, and flows from the recess of the holder body into the accommodating portion. Therefore, the magnetic material in the liquid flowing into the accommodating portion is adsorbed on an inner peripheral surface on the magnet side in the accommodating portion and is prevented from entering the sliding portion in the radial direction.

Therefore, the magnetic material adsorbed on the inner peripheral surface on the magnet side in the accommodating portion is adsorbed at a separated position on the outer peripheral side of the magnet, and thus is unlikely to influence a magnetic flux density applied from the magnet to the Hall IC, and deterioration of detection accuracy of the liquid surface can be prevented.

(4) The liquid level detection device according to (3), in which the accommodating portion includes a plurality of bottomed holes that are disposed along an outer peripheral surface of the magnet and that extend parallel to a rotation center of the magnet holder.

According to the liquid level detection device having the configuration of (4), since the accommodating portion extending on the outer peripheral side of the magnet includes the plurality of bottomed holes, the accommodating portion can be formed while securing rigidity of the holder body.

Therefore, a peripheral wall on a side facing the magnet defining the accommodating portion does not need to be thick so as to ensure rigidity of the holder body, thereby preventing increase in a size of the magnet holder and a size of the liquid level detection device itself.

According to the present invention, it is possible to provide a liquid level detection device capable of preventing a foreign matter in a liquid from entering a sliding portion in a radial direction between a sensor housing and a magnet holder.

The present invention has been briefly described above. Details of the present invention is further clarified by reading a mode for carrying out the invention (hereinafter, referred to as "embodiment") described below with reference to attached drawings.

BRIEF DESCRIPTION OF DRAWINGS

FIG. 6A is a perspective view as viewed from a front surface side of the magnet holder, and FIG. 6B is a perspective view as viewed from a rear surface side of the magnet holder.

FIG. 9A shows a state in which the magnet holder is supported normally with respect to the sensor housing, and FIG. 9B shows a state in which the magnet holder is supported in a state inclined with respect to the sensor housing.

DESCRIPTION OF EMBODIMENTS

Hereinafter, embodiments according to the present invention will be described with reference to the drawings.

Figure 1:
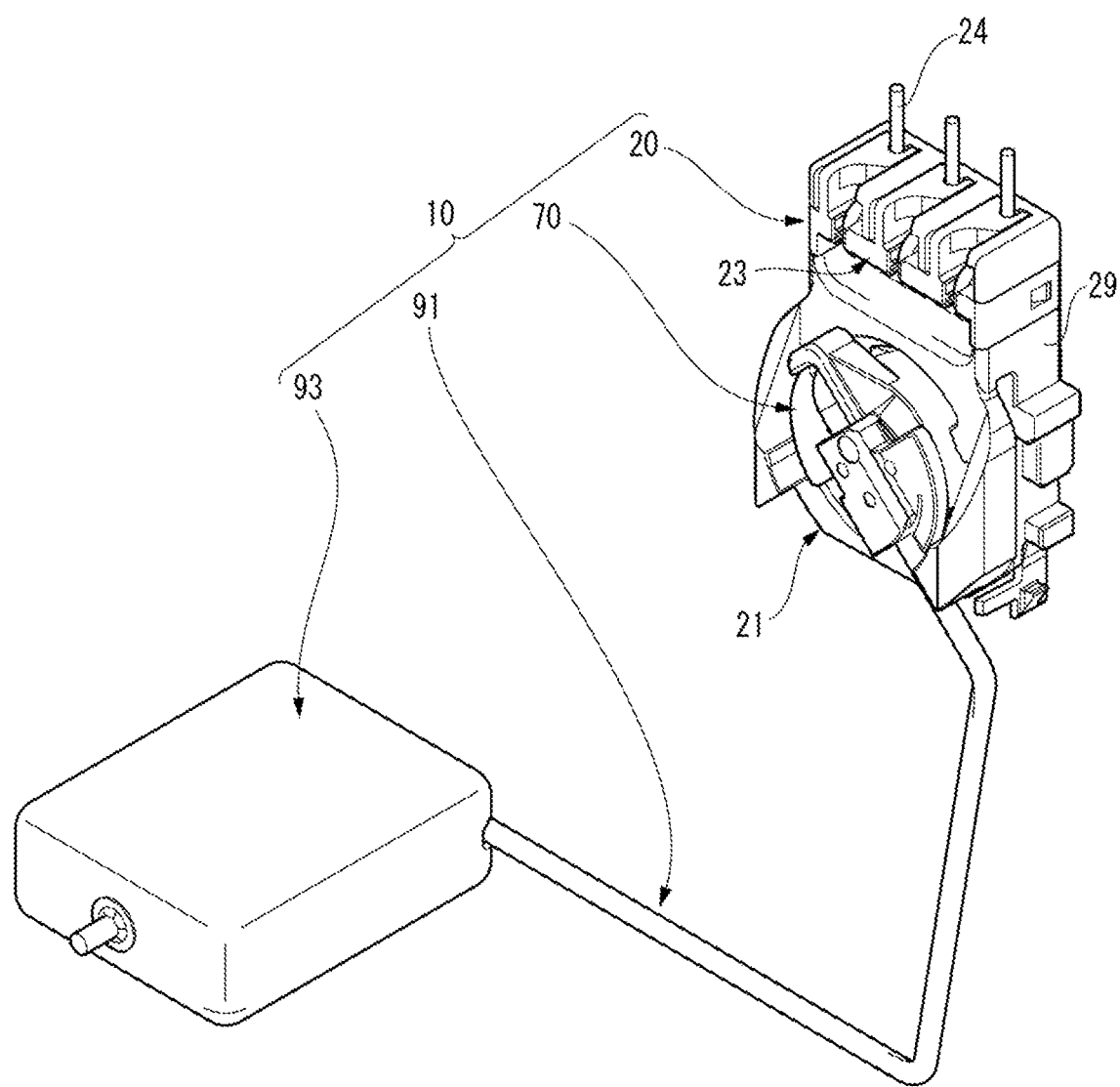
FIG. 1 is an overall perspective view of a liquid level detection device according to an embodiment of the present invention.
Figure 2:
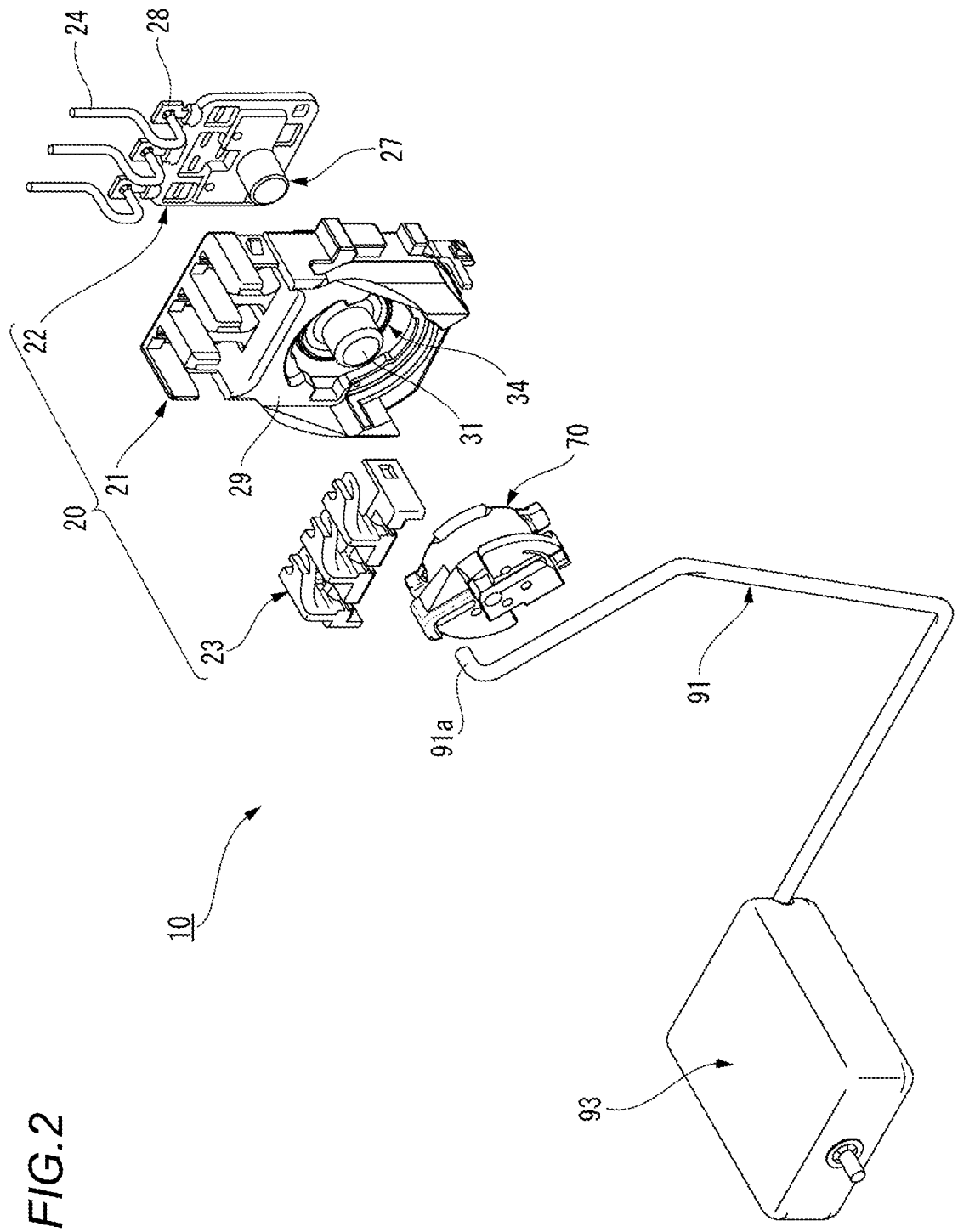
FIG. 2 is an exploded perspective view of the liquid level detection device according to the embodiment of the present invention.
Figure 3:
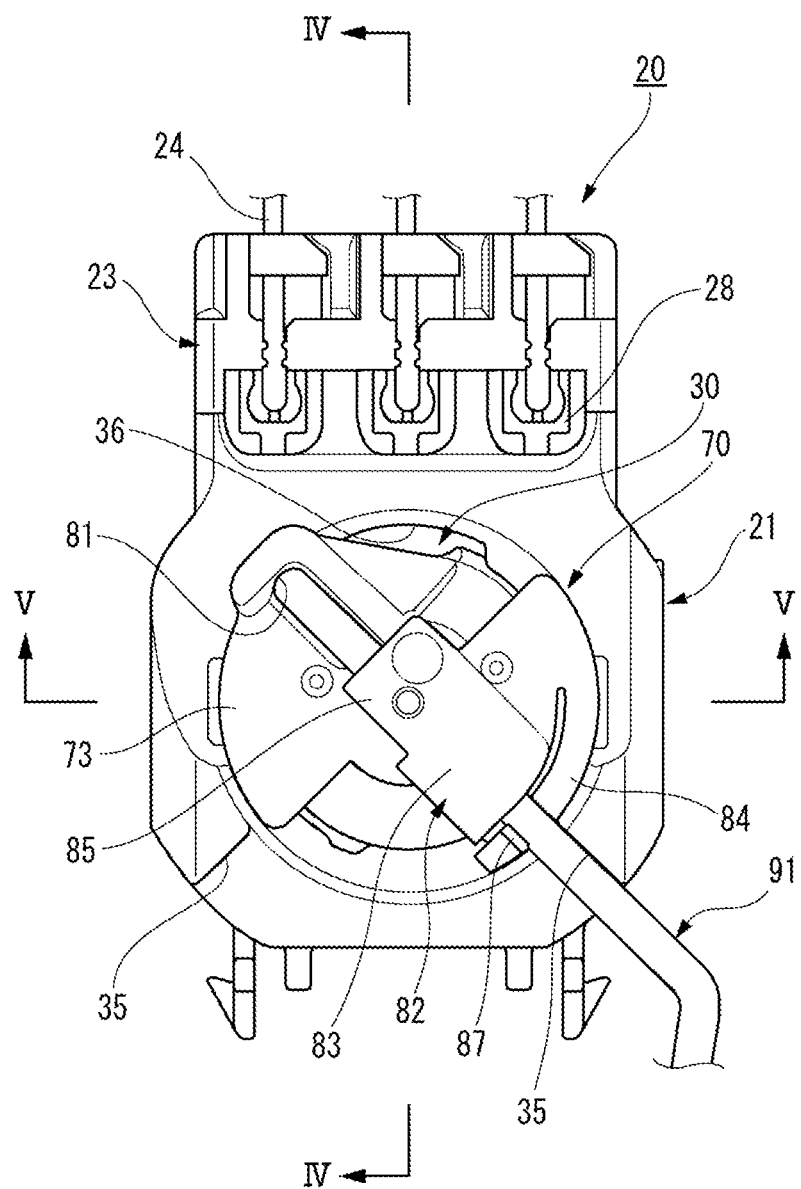
FIG. 3 is a front view of a main part of the liquid level detection device according to the embodiment of the present invention.
Figure 4:
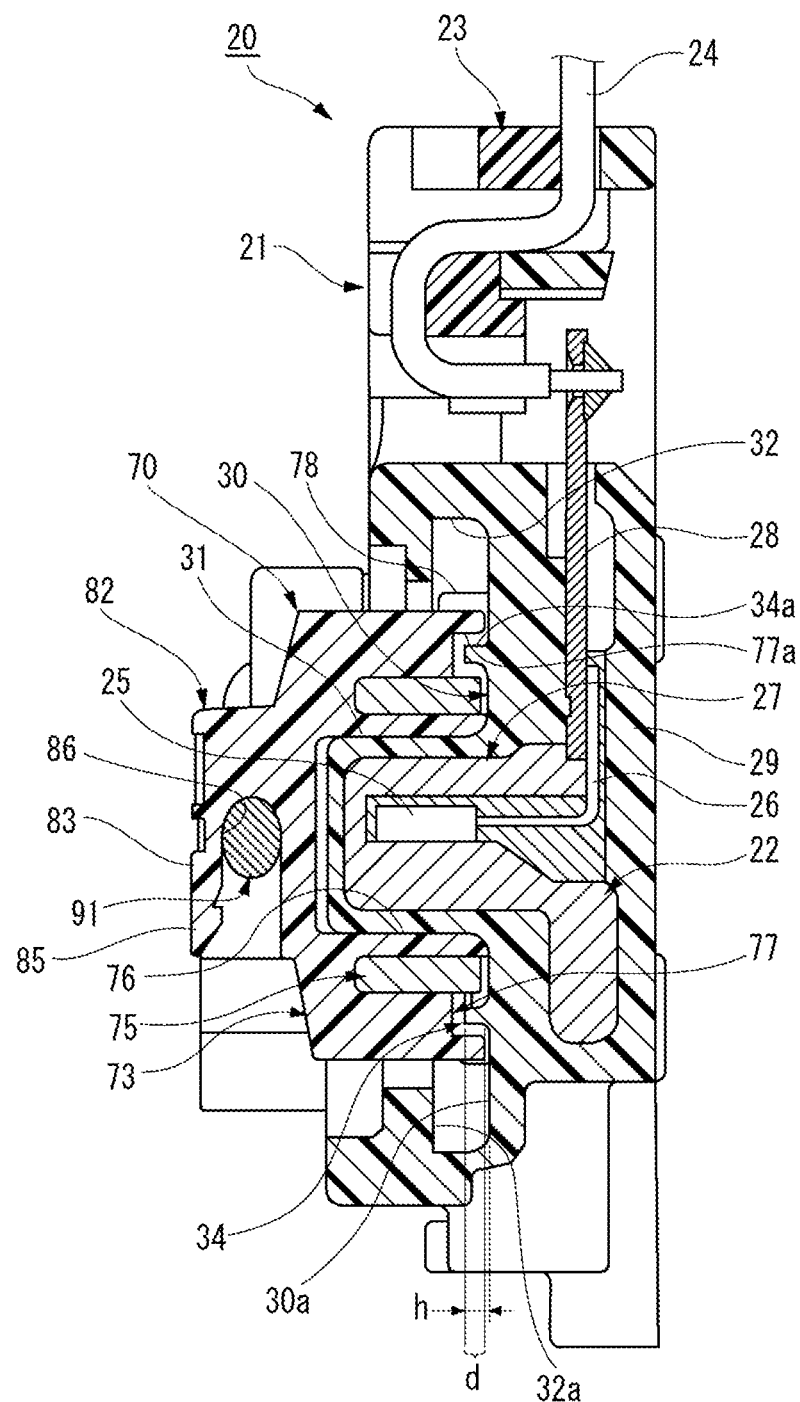
FIG. 4 is a cross-sectional view taken along line IV-IV of the liquid level detection device shown in FIG. 3.
Figure 5:
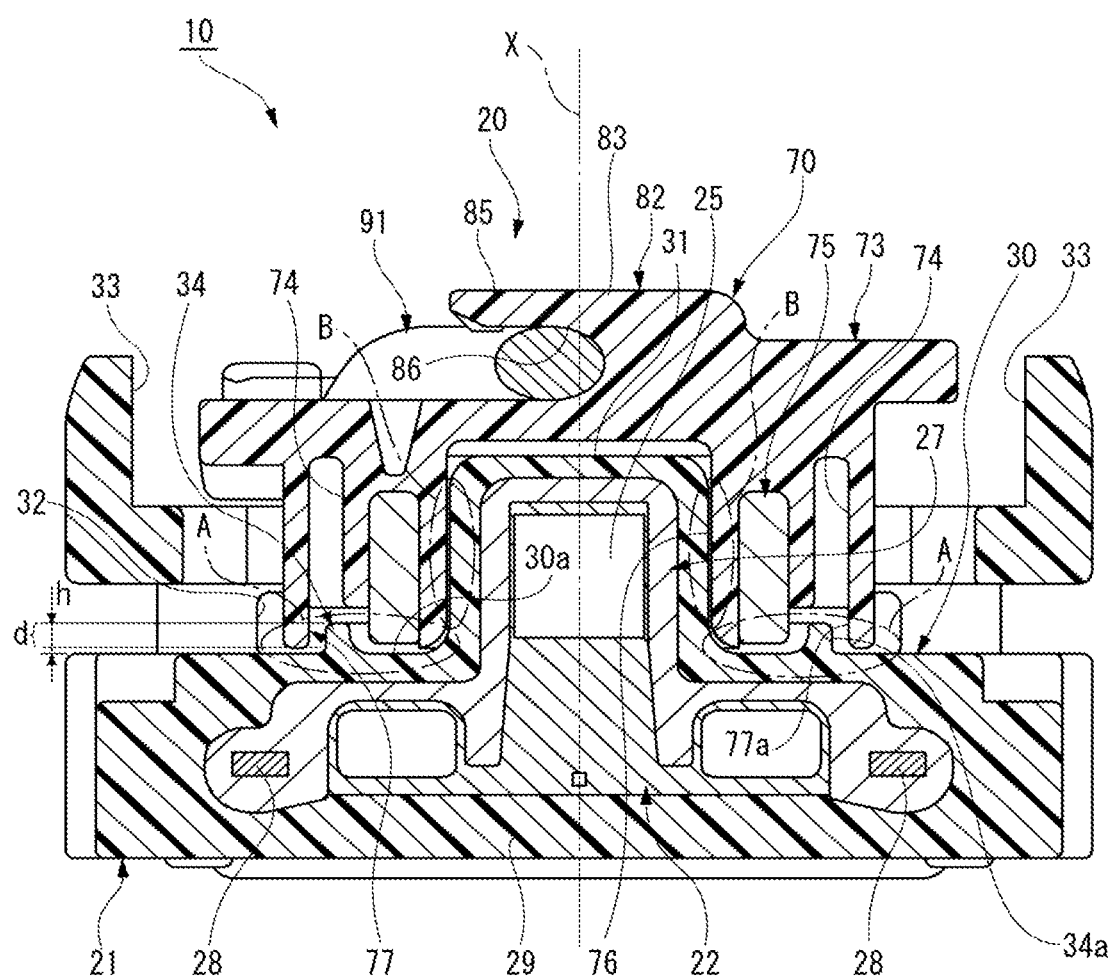
FIG. 5 is a cross-sectional view taken along line V-V of the liquid level detection device shown in FIG. 3.

FIG. 1 is an overall perspective view of a liquid level detection device 10 according to an embodiment of the present invention. FIG. 2 is an exploded perspective view of the liquid level detection device 10 according to the present embodiment. FIG. 3 is a front view of a main part of the liquid level detection device 10 according to the present embodiment. FIG. 4 is a cross-sectional view taken along line IV-IV of the liquid level detection device 10 shown in FIG. 3. FIG. 5 is a cross-sectional view taken along line V-V of the liquid level detection device 10 shown in FIG. 3.

As shown in FIGS. 1 and 2, the liquid level detection device 10 according to the present embodiment includes a device body 20, a magnet holder 70, a float arm 91, and a float 93. The device body 20 includes a sensor housing 21, a sensor unit 22, and a holding member 23.

As shown in FIGS. 3 to 5, the sensor unit 22 and the holding member 23 are assembled to the sensor housing 21. In the sensor unit 22, a Hall IC 27 including a Hall element 25 and three terminals 28 to which leads 26 of the Hall IC 27 are electrically connected are molded and integrated by an insulating mold member. Detection wires 24 held by the holding member 23 are electrically connected to the terminals 28, and the detection wires 24 are drawn out from an upper portion of the sensor housing 21.

One end of the float arm 91 is connected to the magnet holder 70. The other end of the float arm 91 is a free end, and the float 93 is fixed to the free end. The magnet holder 70 is formed in a cylindrical shape having an annular magnet 75 therein, and is rotatably held by being mounted on the front surface side of the sensor housing 21.

The liquid level detection device 10 is, for example, attached to an attached portion of a fuel tank mounted on a vehicle such as an automobile via a stay, and detects a liquid level of fuel stored in the fuel tank.

In the liquid level detection device 10, the float arm 91 swings in accordance with movement of the float 93 which follows the liquid surface, and the magnet holder 70 to which the float arm 91 is connected is rotated with respect to the device body 20. Then, the Hall IC 27 provided in the device body 20 detects a change in a magnetic flux of the magnet 75 of the magnet holder 70, and the detection result is transmitted to a measurement unit (not shown) via the detection wires 24. The measurement unit measures the liquid level based on the detection result from the Hall IC 27, and issues a warning as necessary. For example, the measurement unit issues a warning such as fuel shortage in a fuel tank.

Figure 6A:
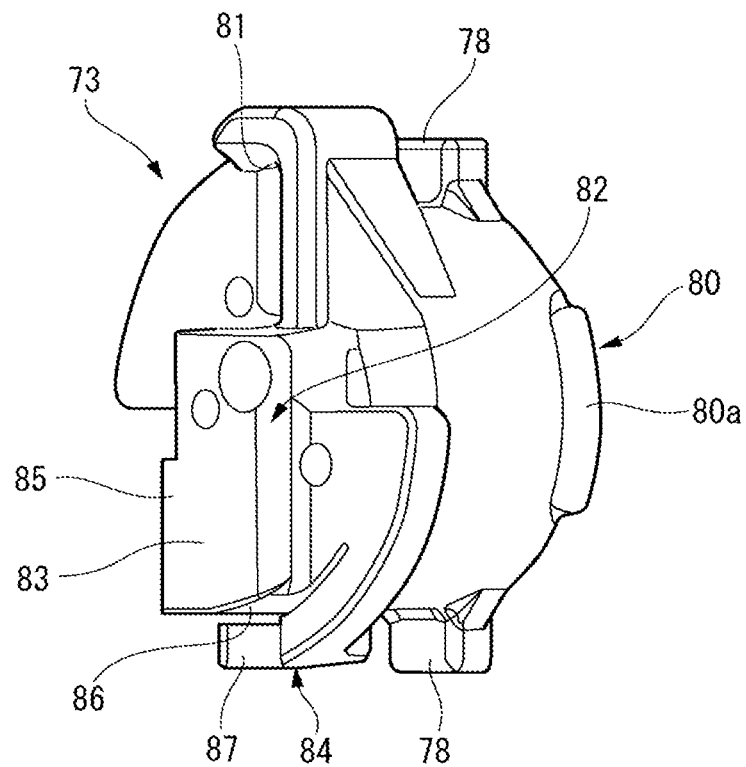
FIGS. 6A and 6B are diagrams for explaining a structure of a magnet holder.
Figure 6B:
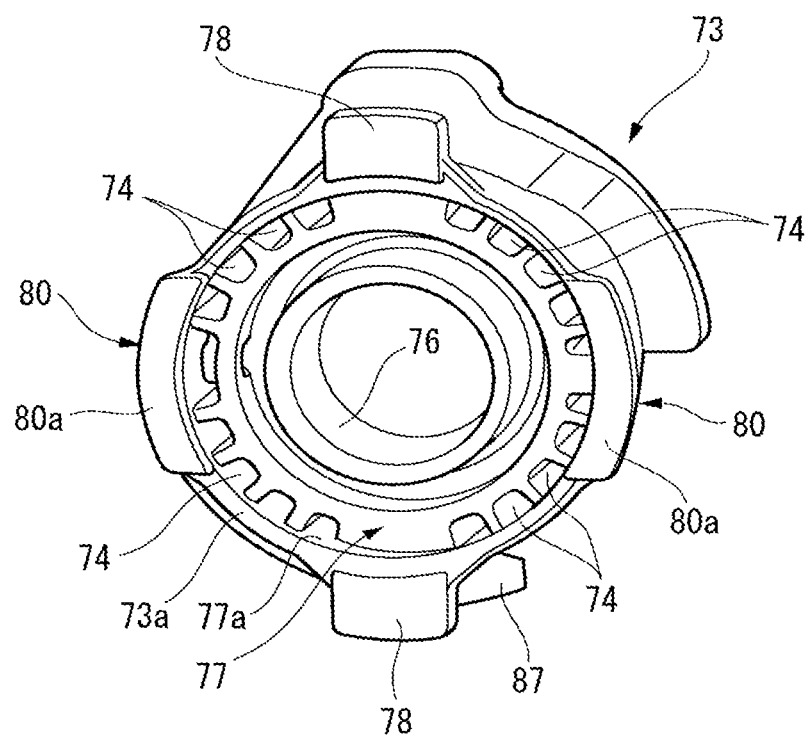

FIGS. 6A and 6B are diagrams for explaining a structure of the magnet holder 70, where FIG. 6A is a perspective view as viewed from a front surface side of the magnet holder 70, and FIG. 6B is a perspective view as viewed from a rear surface side of the magnet holder 70.

As shown in FIG. 6A, the magnet holder 70 has an arm fixing portion 82 on the front surface side thereof. The float arm 91 is fixed to the magnet holder 70 by the arm fixing portion 82. The arm fixing portion 82 includes a locking hole 81, a holding portion 83, and a locking portion 84. The locking hole 81 is formed in a part of a peripheral edge of the magnet holder 70. A base end, which is one end of the float arm 91, is a locking end 91a bent at a right angle, and the locking end 91a is inserted into the locking hole 81 (see FIG. 3).

The holding portion 83 has a holding piece 85 protruding to a lateral side and a holding groove 86 is formed between the holding piece 85 and the front surface of the magnet holder 70. A portion close to the base end of the float arm 91 is fitted into the holding groove 86 from the lateral side. The locking portion 84 is formed on a side opposite to the locking hole 81 of the holding portion 83. The locking portion 84 has a claw portion 87 protruding toward a front side of the magnet holder 70. The claw portion 87 locks a peripheral surface of the float arm 91 fitted in the holding groove 86 of the holding portion 83.

As shown in FIG. 6B, the magnet holder 70 includes a holder body 73 whose central portion on the rear surface side in formed with a shaft recess 76, and the annular magnet 75 accommodated inside the holder body 73 along an inner peripheral surface of the holder body 73 that defines the shaft recess 76. On the rear surface side of the magnet holder 70, a recess 77 is formed on an outer peripheral side of the magnet 75 so as to be recessed on a bottom surface 73a of the holder body 73 to allow a protruding end of a protrusion 34 described later to be inserted.

The recess 77 further includes an accommodating portion 74 extending on the outer peripheral side of the magnet 75 in the holder body 73. The accommodating portion 74 according to the present embodiment includes a plurality of bottomed holes that are disposed along an outer peripheral surface of the magnet 75 and that extend parallel to a rotation center X of the magnet holder 70.

The magnet holder 70 has a pair of flange portions 78 on an edge portion on the rear surface side. The flange portions 78 are arranged at upper and lower positions of the magnet holder 70, and protrude radially outward in opposite directions. The flange portions 78 slightly protrude toward a rear side of the magnet holder 70. The magnet holder 70 has a pair of support protrusions 80, which are support protrusions that contact with a bottom surface 30a of a rotation recess 30, which will be described later, on the edge portion on the rear surface side. These support protrusions 80 are disposed at left and right positions of the magnet holder 70, and are disposed at intermediate positions of the flange portions 78 in a circumferential direction. The support protrusions 80 slightly protrude rearward from the edge portion, extend longer than the flange portions 78 along the circumferential direction of the magnet holder 70, and are formed to have L-shape cross sections that respectively have anti-rattle flange portions 80a protruding radially outward from outer peripheral surfaces of tip end portions thereof.

Figure 7:
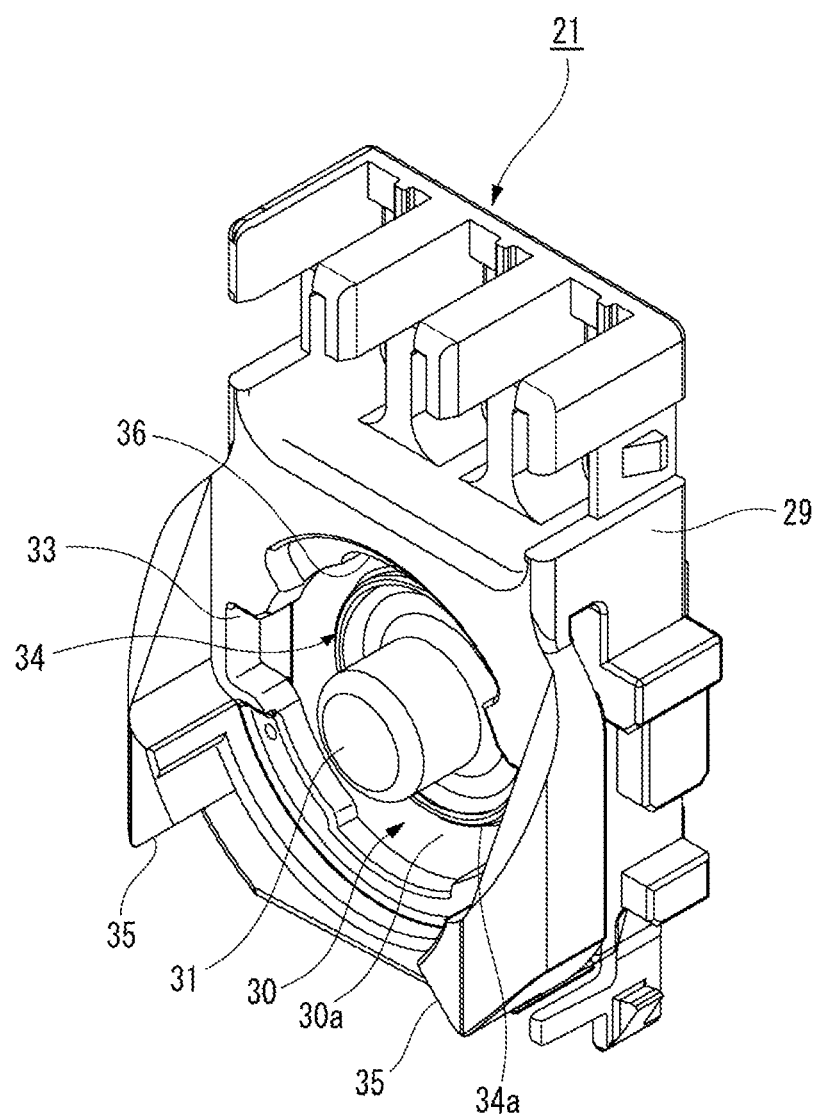
FIG. 7 is a perspective view of a sensor housing.
Figure 8:
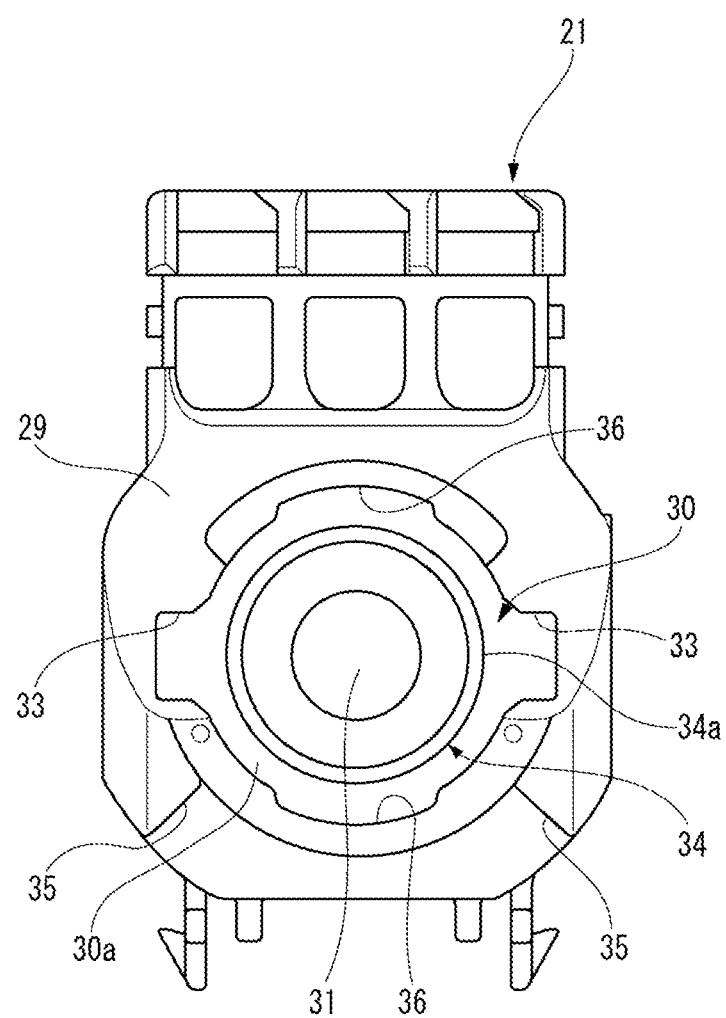
FIG. 8 is a front view of the sensor housing.

FIG. 7 is a perspective view of the sensor housing 21. FIG. 8 is a front view of the sensor housing 21.

As shown in FIGS. 7 and 8, the sensor housing 21 of the device body 20 includes a housing body 29 and a shaft portion 31 protruding from the housing body 29. On a front surface side of the housing body 29, a circular rotation recess 30 in which the magnet holder 70 is rotatably accommodated is provided. The shaft portion 31 provided with the Hall element 25 protrudes at a center of the rotation recess 30. The shaft portion 31 protrudes from the housing body 29 and is inserted into the shaft recess 76 of the holder body 73 to rotatably support the magnet holder 70.

In the housing body 29, a locking groove 32 is formed on an inner peripheral portion of the rotating recess 30 around the entire circumferential direction, and on a front surface side of the housing body 29, a pair of insertion holes 33 and a pair of notch holes 36 are formed positions facing one another on an edge portion of the rotation recess 30. The insertion holes 33 that allow the flange portions 78 to be inserted are formed on left and right positions across the rotation recess 30 on the housing body 29, and communicate with the locking groove 32. The notch holes 36 that allow the anti-rattle flange portions 80a to be inserted are formed on upper and lower positions across the rotation recess 30 on the housing body 29, and communicate with the locking groove 32.

On the front surface of the housing body 29, an annular protrusion 34 is formed to protrude around the shaft portion 31 from a bottom portion of the rotation recess 30 and face the bottom surface 73a of the holder body 73. A protruding end of the protrusion 34 is inserted into the recess 77 formed on the bottom surface 73a of the holder body 73. Needless to say, the protrusion 34 is not limited to an annular shape, and may have various shapes such as a polygonal shape, an oval shape, and a circular shape as long as it surrounds the periphery of the shaft portion 31.

Further, on the front surface side of the sensor housing 21, a pair of stoppers 35 are provided so as to protrude to a lower side of the center of the rotation recess 30. The stoppers 35 are arranged at an interval from each other in the left-right direction on an outer side of the rotation recess 30.

In order to assemble the magnet holder 70 to the sensor housing 21, the magnet holder 70 is fitted into the rotation recess 30 in a state where the flange portions 78 and the anti-rattle flange portions 80a of the magnet holder 70 are respectively fitted to the positions of the insertion holes 33 and the notch holes 36 of the housing body 29. In this way, the flange portions 78 and the anti-rattle flange portions 80a are respectively passed through the insertion holes 33 and the notch holes 36, and the shaft portion 31 of the housing body 29 is inserted into the shaft recess 76 of the magnet holder 70. The protrusion 34 of the housing body 29 enters the recess 77 of the magnet holder 70.

Figure 11:
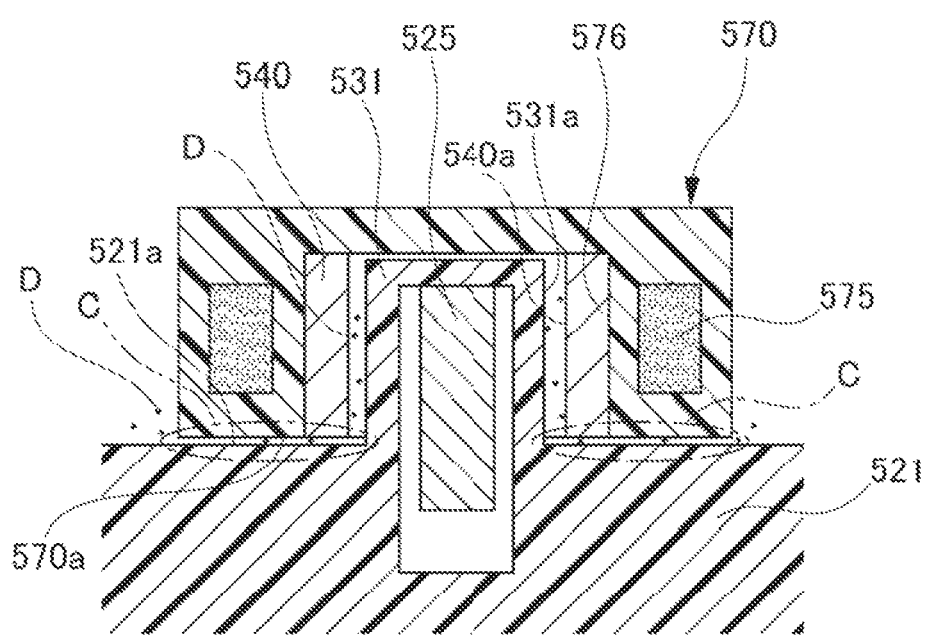
FIG. 11 is a cross-sectional view showing a state in which a central shaft of a frame, a rotary support, and a fitting hole of a magnet holder in a liquid level detection device of related art are mounted.

That is, as shown in FIG. 5, a labyrinth-like channel structure defined by the recess 77 of the magnet holder 70 and the protrusion 34 of the housing body 29 is formed on the sliding portion in the thrust direction between the magnet holder 70 and the sensor housing 21 (a portion indicated by A in FIG. 5 between the bottom surface 73a of the holder body 73 and the front surface of the housing body 29) instead of a flat channel structure such as the liquid level detection device of the related art as shown in FIG. 11.

Next, the magnet holder 70 fitted into the rotating recess 30 of the housing body 29 is rotated so that the locking hole 81 is arranged on the upper side. In this way, the flange portions 78 of the magnet holder 70 enter the locking groove 32 of the housing body 29, and the magnet holder 70 is prevented from coming off the rotating recess 30 of the housing body 29.

When the float arm 91 is mounted on the arm fixing portion 82 of the magnet holder 70 held by the rotation recess 30, a rotation angle of the float arm 91 is restricted due to the float arm 91 and the stoppers 35 provided on the sensor housing 21 being in contact with each other. Thus, coming off of the magnet holder 70 from the sensor housing 21 due to movement of the flange portions 78 of the magnet holder 70 to the positions of the insertion holes 33 is prevented.

In this way, since the rear surface sides of the flange portions 78 and the rear surface sides of the support protrusions 80 respectively become contact portions in contact with the bottom surface 30a forming the rotation recess 30, and the contact portions come into contact with the bottom surface 30a, the magnet holder 70, which is fitted into and rotatably held by the rotation recess 30 of the sensor housing 21, holds the posture of the magnet holder 70. That is, the flange portions 78 and the support protrusions 80 have a function of sliding with respect to the bottom surface 30a of the rotation recess 30 when the magnet holder 70 rotates and thereby holding the posture of the magnet holder 70. As a result, as compared a structure in which the entire rear surface side of the magnet holder 70 is in contact with the bottom surface 30a of the rotation recess 30, the frictional resistance is lowered and the magnet holder 70 rotates smoothly. The flange portions 78 also have a function of contacting with the inner surface 32a of the locking groove 32 facing the bottom surface 30a of the rotating recess 30 and thereby holding the posture of the magnet holder 70.

Next, a function of preventing a foreign matter in a liquid from entering the sliding portion in the radial direction between the sensor housing 21 and the magnet holder 70 will be described.

Figure 9A:
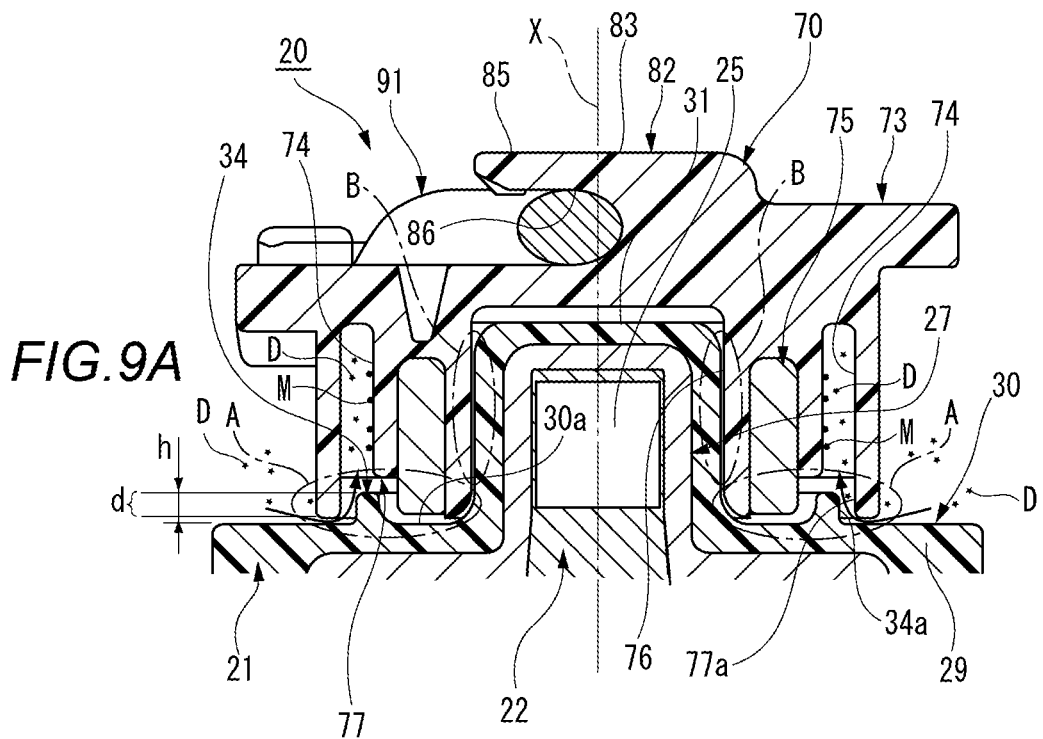
FIGS. 9A and 9B are enlarged cross-sectional views of a main part for explaining action of a sliding portion in a thrust direction between a magnet holder and the sensor housing.
Figure 9B:
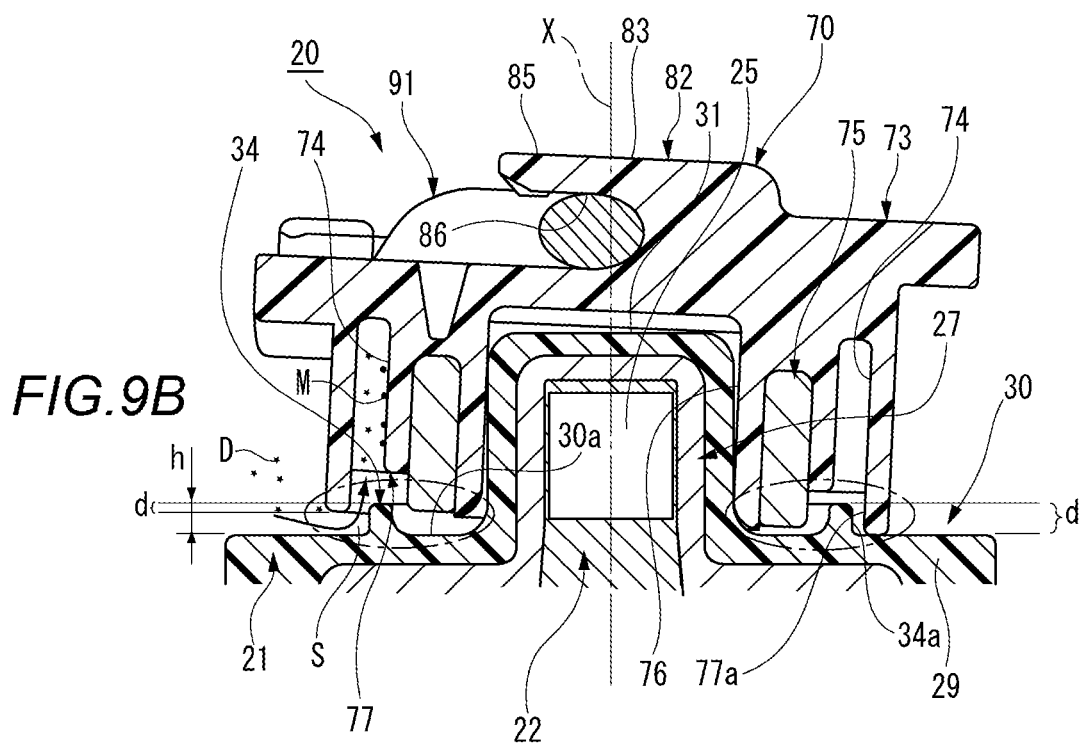
Figure 10:
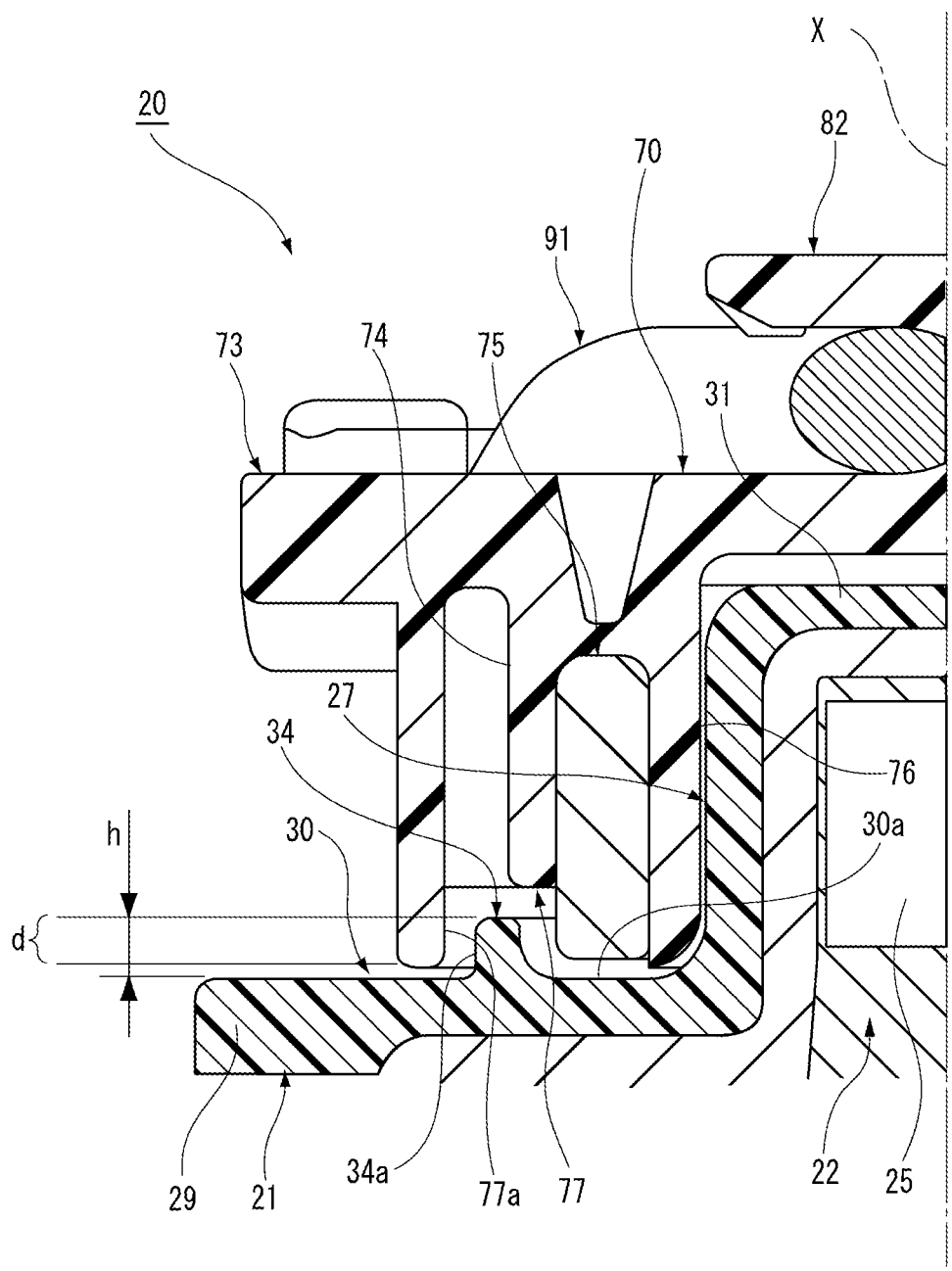
FIG. 10 is an enlarged cross-sectional view of a main part of the sliding portion in the thrust direction between the magnet holder and the sensor housing shown in FIG. 9A.

FIGS. 9A and 9B are enlarged cross-sectional views of a main part for explaining action of the sliding portion in the thrust direction between the magnet holder 70 and the sensor housing 21, where FIG. 9A shows a state in which the magnet holder 70 is supported normally with respect to the sensor housing 21, and FIG. 9B shows a state in which the magnet holder 70 is supported in a state inclined with respect to the sensor housing 21. FIG. 10 is an enlarged cross-sectional view of a main part of the sliding portion in the thrust direction between the magnet holder 70 and the sensor housing 21 shown in FIG. 9A.

Therefore, as indicated by an arrow in FIG. 9A, the liquid flowing from the outside of the sensor housing 21 into between the bottom surface 73a of the holder body 73 and the housing body 29, which is the sliding portion in the thrust direction between the magnet holder 70 and the sensor housing 21, collides with the annular protrusion 34 protruding on the housing body 29 facing the bottom surface 73a of the holder body 73, and flows into the recess 77 of the holder body 73. Therefore, the foreign matter D (including a magnetic material M) in the liquid is prevented from entering the sliding portion in the radial direction between the magnet holder 70 and the sensor housing 21 (a position indicated by B in FIG. 9A between the inner peripheral surface of the shaft recess 76 and the outer peripheral surface of the shaft portion 31).

The recess 77 according to the present embodiment further includes the accommodating portion 74 extending on the outer peripheral side of the magnet 75 in the holder body 73. The accommodating portion 74 includes the plurality of bottomed holes that are disposed along the outer peripheral surface of the magnet 75 and that extend parallel to the rotation center X of the magnet holder 70.

Then, the liquid flowing from the outside of the sensor housing 21 into the sliding portion in the thrust direction collides with a protrusion outer peripheral surface 34a of the annular protrusion 34 protruding on the housing body 29 facing the bottom surface 73a of the holder body 73, and flows from the recess 77 of the holder body 73 into the accommodating portion 74. Therefore, the magnetic material M in the liquid flowing into the accommodating portion 74 is adsorbed on the inner peripheral surface on the magnet side in the accommodating portion 74 and is prevented from entering the sliding portion in the radial direction.

Therefore, the magnetic material M adsorbed on the inner peripheral surface on the magnet side in the accommodating portion 74 is adsorbed at a separated position on the outer peripheral side of the magnet 75, and thus is unlikely to influence the magnetic flux density applied from the magnet 75 to the Hall IC 27, and deterioration of detection accuracy of the liquid surface can be prevented.

Since the accommodating portion 74 extending on the outer peripheral side of the magnet 75 includes the plurality of bottomed holes, the accommodating portion 74 can be formed while securing rigidity of the holder body 73.

Therefore, the peripheral wall on the side facing the magnet 75 defining the accommodating portion 74 does not need to be thick so as to ensure the rigidity of the holder body 73, thereby preventing increase in the size of the magnet holder 70 and the size of the device body 20 itself of the liquid level detection device 10. The accommodating portion of the present invention is not limited to one formed of a plurality of bottomed holes such as the accommodating portion 74, and may be formed of a plurality of semi-annular bottomed holes arranged along the outer peripheral surface of the magnet 75 or one annular bottomed hole.

Further, as shown in FIG. 10, the protrusion 34 protruding on the housing body 29 according to the present embodiment has a protruding height h capable of holding an overlapping state between a recess inner peripheral surface 77a of the holder body 73 defining the recess 77 and the protrusion outer peripheral surface 34a of the protrusion 31 (a state having an overlapping region d in which the recess inner peripheral surface 77a and the protrusion outer peripheral surface 34a overlap each other along the axial direction around the entire periphery) even when the holder body 29 is displaced with respect to the housing body 29 along an axial direction of the shaft portion 31.

Therefore, as shown in FIG. 9B, even when the holder body 29 is greatly inclined and displaced with respect to the housing body 29 along an axial direction of the shaft portion 31, the protrusion outer peripheral surface 34a of the protrusion 34 of the housing body 29 can hold the overlapping state with the recess inner peripheral surface 77a of the recess 77 of the holder body 73. Therefore, even when the holder body 73 is displaced with respect to the housing body 29 along the axial direction of the shaft portion 31, the liquid does not linearly flow into a gap S in the sliding portion in the thrust direction from a direction orthogonal to the axial direction of the shaft portion 31.

As described above, according to the liquid level detection device 10 according to the present embodiment, the foreign matter in the liquid is prevented from entering the sliding portion in the radial direction between the magnet holder 70 and the sensor housing 21. Therefore, it is possible to prevent such a problem that locking occurs in the sliding portion in the radial direction due to the foreign substance, which causes rotation failure of the magnet holder 70, and thereby causes deterioration of detection accuracy of the liquid surface.

Incidentally, the present invention is not limited to the above-described embodiments, but may be appropriately modified, improved or the like. In addition, respective configuration elements of the embodiments are arbitrary and not limited in view of a material, a shape, a dimension, a quantity, an arrangement location, or the like, so long as the present invention can be achieved.

Characteristics of the embodiments of the liquid level detection device according to the present invention described above are briefly summarized in the following [1] to [4], respectively.

[1] A liquid level detection device (10) including:
a magnet holder (70) including a holder body (73) in which a shaft recess (76) is formed and a magnet (75) housed inside the holder body (73) along an inner peripheral surface of the holder body (73) defining the shaft recess (76);
a sensor housing (21) including a housing body (29) and a shaft portion (31) that protrudes from the housing body (29) and that is inserted into the shaft recess (76) to rotatably support the magnet holder (70);
a float arm (91) whose one end is fixed to the magnet holder (70) and whose another end is attached to a float (93) configured to move vertically according to a liquid level;
a Hall IC (27) provided in the sensor housing (21) and configured to detect a displacement of the magnet (75);
an annular protrusion (34) protruding around the shaft portion (31) from the housing body (29) and facing a bottom surface (73*a*) of the holder body (73); and
a recess (77) formed on the bottom surface (73*a*) of the holder body (73) and into which a protruding end of the protrusion (34) is inserted.

[2] The liquid level detection device (10) according to (1),
in which the protrusion (34) has a protruding height (h) capable of holding an overlapping state between a recess inner peripheral surface (77*a*) of the holder body (73) defining the recess (77) and a protrusion outer peripheral surface (34*a*) of the protrusion (34) even when the holder body (29) is displaced with respect to the housing body (29) along an axial direction of the shaft portion (31).

[3] The liquid level detection device (10) according to [1] or [2],
in which the recess (77) further includes an accommodating portion (74) extending on the outer peripheral side of the magnet (75) in the holder body (73).

[4] The liquid level detection device (10) according to [3],
in which the accommodating portion (74) includes a plurality of bottomed holes that are disposed along an outer peripheral surface of the magnet (75) and that extend parallel to a rotation center (X) of the magnet holder (70).

What is claimed is:

1. A liquid level detection device comprising:
a magnet holder comprising a holder body in which a shaft recess is formed and a magnet housed inside the holder body along an inner peripheral surface of the holder body defining the shaft recess;
a sensor housing comprising a housing body and a shaft portion that protrudes from the housing body and that is inserted into the shaft recess to rotatably support the magnet holder;
a float arm whose one end is fixed to the magnet holder and whose another end is attached to a float configured to move vertically according to a liquid level;
a Hall IC provided in the sensor housing and configured to detect a displacement of the magnet;
an annular protrusion protruding around the shaft portion from the housing body and facing a bottom surface of the holder body, the annular protrusion being provided radially outside the magnet; and
a recess formed on the bottom surface of the holder body and into which a protruding end of the protrusion is inserted,
wherein the holder body is configured to be able to be angularly displaced with respect to the housing body in a tilt direction tilted with respect to an axial direction of the shaft portion, and
wherein the protrusion has a height h at a protrusion outer peripheral surface thereof and is configured such that the outer peripheral surface of the protrusion overlaps an outer distal end surface of the holder body in the axial direction of the shaft portion in a state where the holder body is angularly displaced with respect to the housing body in the tilt direction.

2. A liquid level detection device comprising:
a magnet holder comprising a holder body in which a shaft recess is formed and a magnet housed inside the holder body along an inner peripheral surface of the holder body defining the shaft recess;
a sensor housing comprising a housing body and a shaft portion that protrudes from the housing body and that is inserted into the shaft recess to rotatably support the magnet holder;
a float arm whose one end is fixed to the magnet holder and whose another end is attached to a float configured to move vertically according to a liquid level;
a Hall IC provided in the sensor housing and configured to detect a displacement of the magnet;
an annular protrusion protruding around the shaft portion from the housing body and facing a bottom surface of the holder body; and
a recess formed on the bottom surface of the holder body and into which a protruding end of the protrusion is inserted,
wherein the recess further comprises an accommodating portion extending on an outer peripheral side of the magnet in the holder body, and
wherein the accommodating portion is formed of a plurality of bottomed holes that are disposed along an outer peripheral surface of the magnet, the plurality of bottom holes extending in a direction parallel to a rotation center of the magnet holder.

\* \* \* \* \*